(12) United States Patent
Koehler et al.

(10) Patent No.: US 12,228,526 B2
(45) Date of Patent: Feb. 18, 2025

(54) FOCUSING GRATING DEVICES WITH LARGE ASPECT RATIO

(71) Applicant: KONINKLIJKE PHILIPS N.V., Eindhoven (NL)

(72) Inventors: Thomas Koehler, Norderstedt (DE); Gereon Vogtmeier, Aachen (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 215 days.

(21) Appl. No.: 17/916,167

(22) PCT Filed: Mar. 25, 2021

(86) PCT No.: PCT/EP2021/057673
§ 371 (c)(1),
(2) Date: Sep. 30, 2022

(87) PCT Pub. No.: WO2021/197990
PCT Pub. Date: Oct. 7, 2021

(65) Prior Publication Data
US 2023/0221264 A1     Jul. 13, 2023

(30) Foreign Application Priority Data

Apr. 1, 2020   (EP) .................................... 20167480

(51) Int. Cl.
*G01N 23/041*   (2018.01)
*G21K 1/02*   (2006.01)
*G21K 1/06*   (2006.01)

(52) U.S. Cl.
CPC .......... *G01N 23/041* (2018.02); *G21K 1/025* (2013.01); *G21K 1/06* (2013.01); *G21K 2201/067* (2013.01); *G21K 2207/005* (2013.01)

(58) Field of Classification Search
CPC ................. G01N 23/041; G21K 1/025; G21K 2207/005; G21K 1/06
See application file for complete search history.

(56) References Cited

U.S. PATENT DOCUMENTS

| | | |
|---|---|---|
| 2007/0183583 A1 | 8/2007 | Baumann |
| 2008/0063146 A1 | 3/2008 | Harding |

(Continued)

FOREIGN PATENT DOCUMENTS

| | | |
|---|---|---|
| CN | 2530669 Y | 1/2003 |
| JP | 2014190781 A | 10/2014 |
| WO | WO2017036729 A1 | 3/2017 |

OTHER PUBLICATIONS

PCT International Search Report, International application No. PCT/EP2021/057673, Jun. 2, 2021.

*Primary Examiner* — David P Porta
*Assistant Examiner* — Mamadou Faye
(74) *Attorney, Agent, or Firm* — Larry Liberchuk

(57) ABSTRACT

A focusing grating device (100) is described comprising a substrate (402) and a grating comprising a plurality of grating features (408) positioned on the substrate (402). The grating features (408) are positioned non-perpendicular to the substrate surface, thereby inducing a first focusing direction. The substrate (402) is curved, thereby inducing a second focusing direction, which is different from the first focusing direction. An X-ray system (300) comprising such a focusing grating device (100) as well as a method for producing such a focusing grating device (100) are also described.

12 Claims, 6 Drawing Sheets

(56) References Cited

U.S. PATENT DOCUMENTS

| | | | | |
|---|---|---|---|---|
| 2011/0052800 | A1* | 3/2011 | Setomoto | B29D 11/00769 |
| | | | | 264/1.7 |
| 2013/0207309 | A1* | 8/2013 | Okada | B82Y 10/00 |
| | | | | 264/293 |
| 2013/0235973 | A1* | 9/2013 | Murakoshi | G01N 23/041 |
| | | | | 378/62 |
| 2014/0334604 | A1* | 11/2014 | Teshima | G21K 1/025 |
| | | | | 378/154 |
| 2015/0279496 | A1* | 10/2015 | Bauer | A61B 6/4021 |
| | | | | 378/19 |

* cited by examiner

FOCUSING GRATING DEVICES WITH LARGE ASPECT RATIO

FIELD OF THE INVENTION

The invention relates to the field of X-ray imaging. More particularly, the present invention relates to focusing X-ray gratings with large aspect ratio for use in X-ray systems such as in differential phase contrast and/or dark-field imaging systems for X-ray imaging, to corresponding X-ray systems and to manufacturing methods for producing such focusing X-ray gratings.

BACKGROUND OF THE INVENTION

Dark-field imaging and differential phase contrast imaging have attracted much interest in both medical and non-medical applications (e.g. security, building and construction, etc.) because they offer greater sensitivity with respect to conventional X-ray imaging, enabling the imaging of low-density materials non-destructively. In grating based differential phase contrast X-ray imaging or dark-field X-ray imaging, gratings with large aspect ratio (e.g. up to 70) are used. In view of this large aspect ratio, these gratings need to be focused towards the X-ray focal spots used in the application. LIGA, which is a lithographic fabrication technology including lithography, electroplating, and molding, is currently the manufacturing technique that is used for the production of such gratings with large aspect ratio. Usually, gratings are manufactured such that the grating lamella are grown perpendicular on a flat substrate. Focusing is then done by bending the gratings together with the entire substrate. The grating orientation is chosen to be parallel to the bending axis.

In dark-field computed tomography (CT), gratings are traditionally oriented parallel to the system rotation axis (A). The grating arrangement is shown in FIG. 1. The problem with this orientation lies in the limited acceptance angle of the source grating G0. This source grating is close to the focal spot (about 10 cm) and has a high aspect ratio (roughly 70). This high aspect ratio implies that the acceptance angle is rather narrow (namely $\alpha=14$ mrad). This aspect is illustrated in FIG. 2. In dark-field CT applications, the distance DO from source to source grating G0 is only 10 cm. Basic geometry calculation shows that the maximum focal spot size S compatible with a grating opening of p=2 micrometer and an aspect ratio of 50 is $S=\alpha\, D0=1.4$ mm. If the focal spot size is larger, then loss of visibility occurs. As matter of fact, the focal spot is that small only for beams at very small fan-angles. For beams at even moderate fan-angles (typical fan-angles in medical CT system reach up to ±30 degrees), the focal spot is even much wider since it is physically a large area on a rather shallow anode disk (see FIG. 1).

One solution that has been suggested to deal with loss of visibility due to the small acceptance angles of gratings with high contrast ratios is to alter the grating orientation to be perpendicular to the rotation axis of the system. In this so-called "horizontal grating arrangement", the focal spot size parallel to the grating direction does not impact the visibility, and it is applicable for example to systems using structured X-ray emission, where there is no need for a source grating G0. For systems requiring a source grating, the problems of loss of visibility due to small acceptance angles for the gratings still need to be solved.

SUMMARY OF THE INVENTION

It is an object of the present invention to provide good focusing grating devices having a high aspect ratio for use in X-ray imaging, such as for example differential phase contrast and dark-field imaging, as well as good Xray imaging systems comprising such focusing grating devices and good methods for manufacturing such focusing grating devices.

It is an advantage of embodiments of the present invention that focusing grating devices with high aspect ratio are obtained wherein focusing is obtained in two non-parallel directions, so that the gratings allow for a large acceptance angle for the radiation used in the X-ray imaging system incorporating such focusing grating devices.

It is an advantage of embodiments of the present invention that accurate focusing grating devices with high aspect ratio are obtained, which allow focusing in two different directions according to predetermined focusing requirements without the need for bending the substrate in the final product in both directions in a well-defined way.

The mentioned object and advantages are obtained by devices and methods according to embodiments of the present invention.

The present invention relates to a focusing grating device for use in X-ray imaging comprising a substrate, and a grating comprising a plurality of grating features positioned on the substrate. The grating features are positioned non-perpendicular to the substrate surface, thereby inducing a first focusing direction for an X-ray radiation beam, and substrate is curved, thereby inducing a second focusing direction for the X-ray radiation beam, which is different from the first focusing direction. It is an advantage of embodiments of the present invention that a focusing grating device is obtained that allows for focusing in two different focusing directions. It is an advantage of embodiments according to the present invention that an accurate and well-defined focusing grating device is obtained. Such embodiments may advantageously be used for grating devices for use in differential phase contrast and/or dark-field X-ray imaging techniques, although embodiments are not limited thereto. It is an advantage of embodiments of the present invention that the focusing grating device scan be used in systems requiring high energies, e.g. as required for medical imaging.

The substrate may have a bending in a single direction only, i.e. in the second direction. It is an advantage of embodiments of the present invention that focusing in at least two different focusing directions is obtained while the substrate of the focusing grating device finally only needs to remain bent in a single direction, since accurate bending of a substrate according to a two-dimensional bended surface shape or in two directions in a well-defined way is complex or even not possible.

A side edge of at least one of the grating features may make for at least one position an angle of at least 1 degree with respect to the perpendicular direction on the substrate.

By dealing with the required focusing of the grating for one dimension during the manufacturing of the grating, thus creating features for focusing in that dimension with the correct size, afterwards only bending in one other dimension is required. As bending afterwards induces deformation, this will be limited to deformation in this one other dimension rather than deformation in two dimensions. Therefore, gratings according to embodiments of the present invention result in less overall deformation.

The focusing grating device may have an aspect ratio of at least 30, for example 50. The focusing grating device in some examples may have an aspect ratio of 65.

A bending stress in at least part of the grating features in the second focusing direction may be substantially higher than a bending stress in said at least part of the grating features in the first focusing direction. Since the grating features are at least partly made in a bent configuration, the grating features may have less bending stress in this direction than in the direction of curvature of the substrate in the final focusing grating device. Where in embodiments of the present invention reference is made to a substantially higher bending stress, reference may be made to a bending stress that is e.g. at least 10%, e.g. at least 25%, e.g. at least 50% higher than in other directions.

The grating features may be grating lamellae.

The grating features may be made of X-ray absorbing material. The X-ray absorbing material may for example be gold, lead, tungsten, or bismuth, although embodiments are not limited thereto. In particular alloys containing heavy metals may be used. Advantageously, high z materials are used that can be electroplated.

The substrate may comprise or may be made of a material being transparent for the X-rays used or being a low absorbing X-ray material, such as for example it may be any of graphite, glass, or Capton.

The present invention also relates to an X-ray system for grating based X-ray imaging comprising at least one focusing grating device as described earlier.

The X-ray system may be a dark-field imaging system and/or a differential phase contrast imaging system.

The X-ray system may comprise a focusing grating device as described previously close to the X-ray source, for example at a distance closer than 20 cm, e.g. closer than 15 cm, e.g. closer to 10 cm.

The present invention also relates to a method for producing a focusing grating device for focusing in a first direction and a second direction, the first direction being different from the second direction. The method comprises:
  obtaining a stack of at least a substrate and a resist layer;
  applying a bending of the stack in the first direction;
  performing a lithographic process on the stack while the substrate is bent in the first direction;
  electroplating the grating material so as to form the grating features;
  substantially reversing the bending of the stack, and
  after said reversing the bending, applying a further bending of the stack so as to induce the second focusing direction in the focusing grating device.

Where in embodiments of the present invention reference is made to substantially reversing a bending of a stack, reference is made to the step of undoing the bending of the stack in such a way that within allowable tolerances, the stack has its original configuration again. In some embodiments this may mean bringing the stack back into a substantially flat configuration if the stack initially was flat before the bending was applied.

Performing a lithographic process may comprise applying a mask. It is an advantage of embodiments of the present invention that the mask is applied when the substrate is bent in the first direction, so as to obtain grating features and slits in between these features having a constant width.

Performing a step of developing the resist layer in the lithographic process and performing the electroplating may be done prior to said substantially reversing the bending of the stack.

Providing a stack comprising a resist may comprise providing a stack with a resist layer having a varying thickness along the first direction. Furthermore, the process may include either using a mask that is bent. The required pitch may be designed to take into account that the mask will be used, irradiated, when being bended. Since bending the mask will influence the pitch, when designing the mask, this may be taken into account to correct for variations of the pitch induced by the bending of the mask.

The present invention also relates to the use of a focusing grating device as described previously for X-ray imaging. The use of a focusing grating device may be a use in differential phase contrast imaging and/or in dark-field imaging.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter. The reference figures quoted below refer to the attached drawings.

Figure 1:
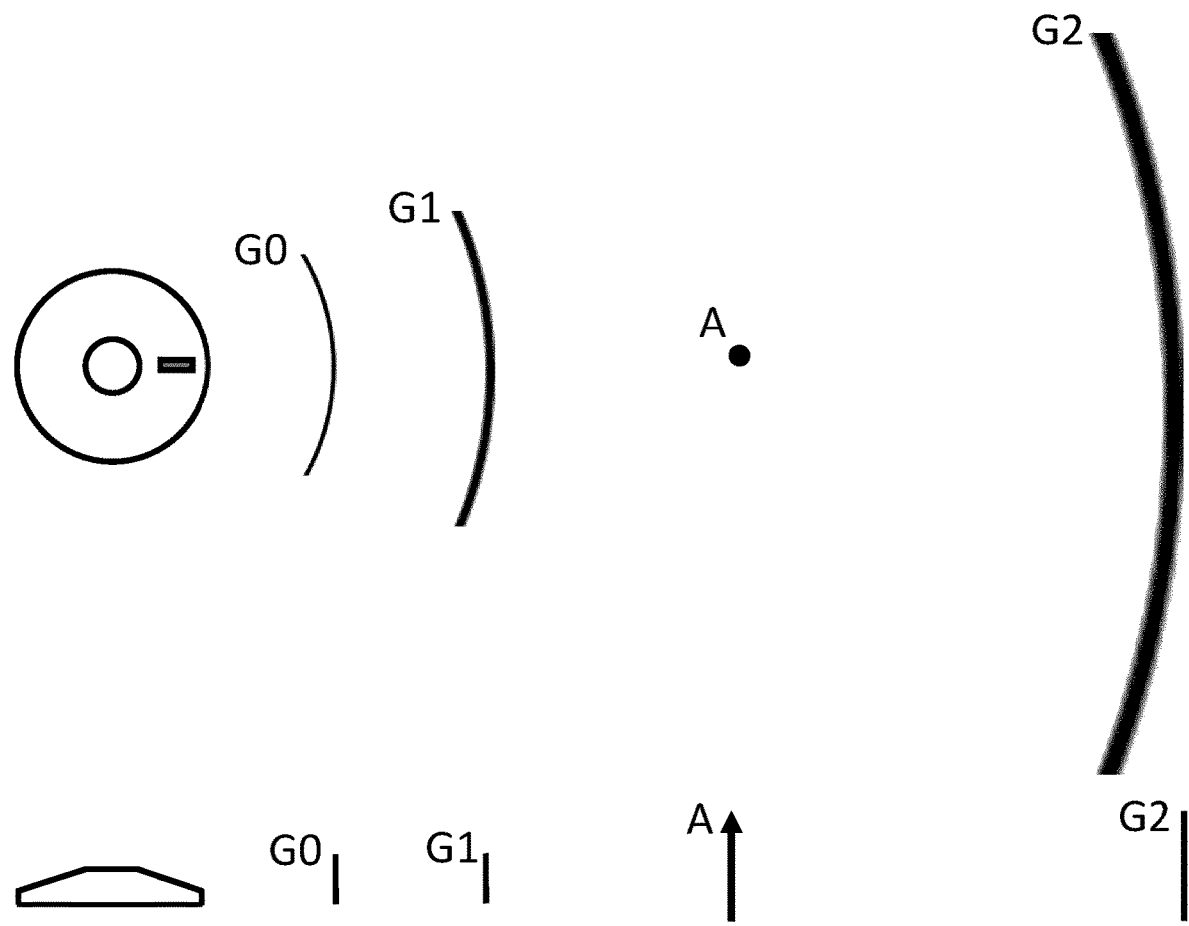
FIG. 1 illustrates a state of the art grating arrangement for a dark-field computed tomography (CT) X-ray imaging system illustrating the orientation of the gratings.
Figure 2:
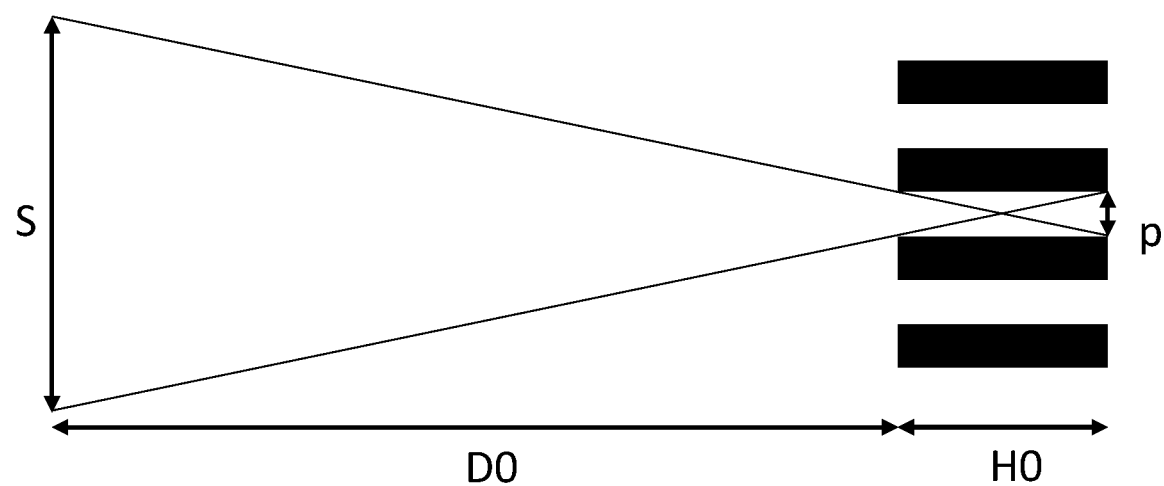
FIG. 2 illustrates the acceptance angle obtained using a grating in an arrangement as shown in FIG. 1 and the corresponding maximal focal spot size that can be used with such a grating.

In the different figures, the same reference signs refer to the same or analogous elements.

DETAILED DESCRIPTION OF EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second and the like, e.g. first direction and second direction, in the description and in the claims, are used for distinguishing between similar elements and not necessarily for describing a sequence, either temporally, spatially, in ranking, or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. The indefinite article "a" or "an" does not exclude a plurality.

Reference throughout this specification to "one embodiment" or "an embodiment" means that a particular feature, structure, or characteristic described in connection with the embodiment is included in at least one embodiment of the present invention. Furthermore, the particular features, structures, or characteristics may be combined in any suitable manner, as would be apparent to one of ordinary skill in the art from this disclosure, in one or more embodiments.

In the description provided herein, numerous specific details are set forth. However, it is understood that embodiments of the invention may be practised without these specific details. In other instances, well-known methods, structures and techniques have not been shown in detail in order not to obscure an understanding of this description.

Figure 3A:
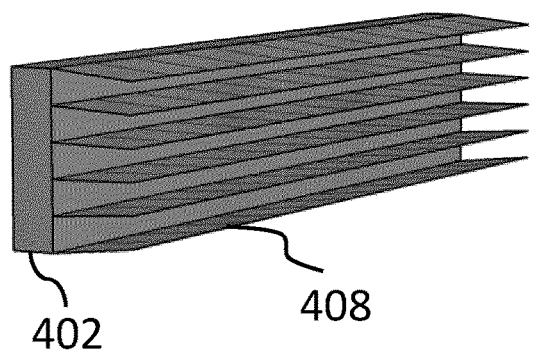
FIG. 3 illustrates a focusing grating device according to an embodiment of the present invention.
Figure 3B:
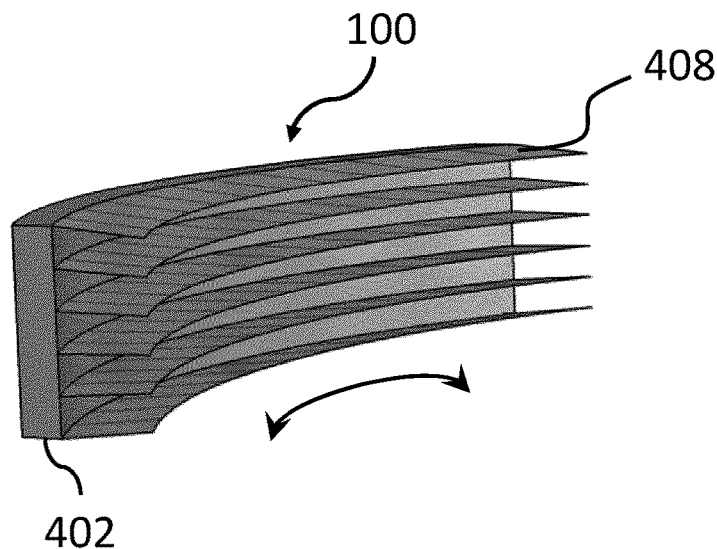

In a first aspect, the present invention relates to a focusing grating device. The focusing grating devices may advantageously be used for focusing X-ray radiation beams in X-ray imaging applications, such as for example differential phase contrast imaging or dark-field imaging, although embodiments are not limited thereto. In the context of the presently claimed invention, a focusing grating device refers to a grating device that focuses X-ray radiation into a spot through the structural features of the grating by which focusing in two directions is provided. FIG. 3 shows a schematic diagram of the focusing grating device 100 according to embodiments of the present invention. The focusing grating device 100 comprises a substrate 402 and a grating. The grating has a plurality of grating features 408 positioned on the substrate 402. The grating features 408 are positioned non-perpendicular to the substrate 402 surface as illustrated in FIG. 3A, and thereby induce a first focusing direction for an incoming X-ray radiation beam. FIG. 3A illustrates that under the described circumstances, the grating features 408 focus the radiation toward a line. In the final focusing grating device 100, the substrate is curved, and induces, by the curving (curvature direction schematically indicated by the double arrow in FIG. 3B), a second focusing direction, which is different from the first focusing direction. FIG. 3B illustrates that the grating features 408 focus the radiation towards a single point.

By introducing one focusing direction by the shape and position of the grating features, the substrate in the final focusing grating device 100 only needs to be bended in one other direction, to provide two focusing directions for an incoming radiation beam, as schematically illustrated in FIG. 3B. The substrate 402 used in the focusing grating device 100 may be made of a material being transparent for the X-rays used or being a low absorbing X-ray material, such as for example it may be any of graphite, glass, or Capton®.

The focusing grating device 100 according to embodiments of the present invention may have a large aspect ratio. For example, in some embodiments, the focusing grating device 100 may have an aspect ratio of at least 30, for example of at least 50, for example up to at least 65 or even up to at least 70. They can e.g. typically be used for focusing towards the X-ray focal spot.

According to embodiments of the present invention, during manufacturing of the grating device, the substrate 402 is bended in a bending direction prior to the formation of the grating features 408, and unbended again after the formation of the grating features 408, such that the grating features 408 are positioned non-perpendicular to the substrate surface 402. This introduces a first focusing direction induced by the grating features 408. As shown in FIG. 3B, by bending the substrate after all features have been produced in a further direction (bending schematically indicated by the double arrow), and maintaining this bending in the final focusing grating device 100, the focusing grating device 100 provides two focusing directions. The bending radius of the substrate may be in the range of 5 to 15 cm, in some embodiments. The manufacturing of the focusing grating device will be fully elucidated later, with reference to FIG. 6.

In at least some embodiments, the grating features 408 are shaped such that a side edge of at least one of the grating features 408 makes, for at least one position, an angle of at least 0.1 degree, for example at least 0.5 degree, for example at least 1 degree with respect to the perpendicular direction on the substrate 402. Due to their way of manufacturing, in the final focusing grating device 100, a bending stress in at least part of the grating features 408 in the second focusing direction may be substantially higher than a bending stress in said at least part of the grating features 408 in the first focusing direction.

Figure 4:
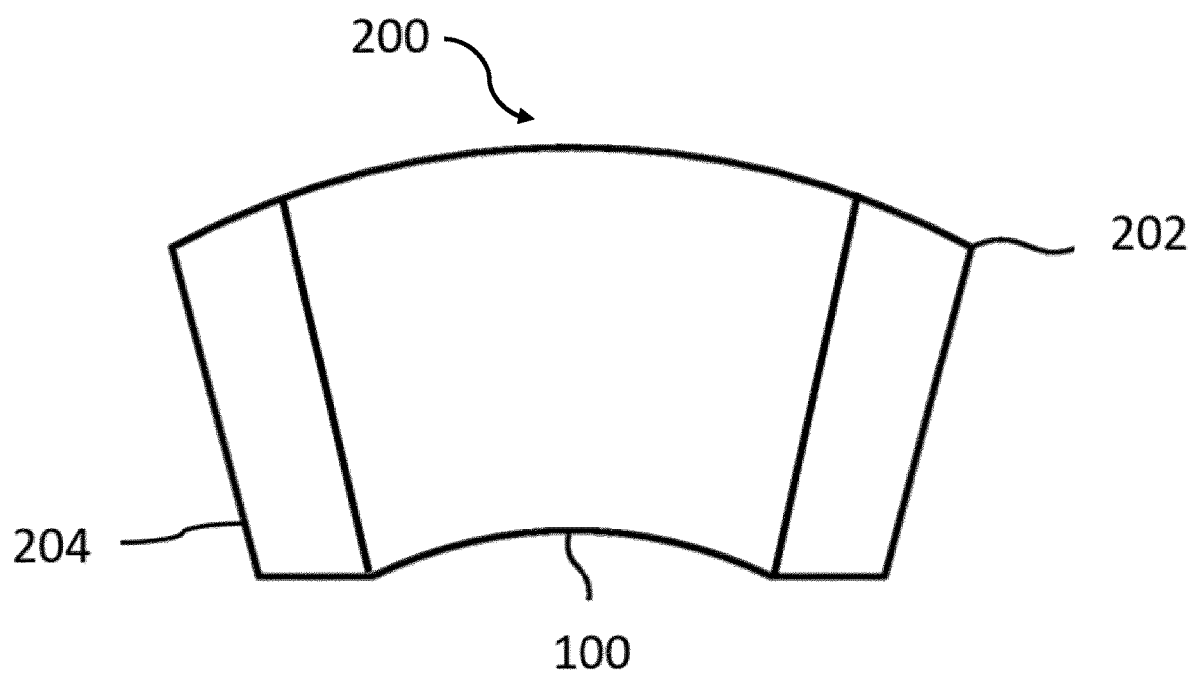
FIG. 4 illustrates a grating support as can be used in embodiments according to the present invention for inducing, during the manufacturing process of the focusing grating device, the curvature required.

In order to induce the curvature of the substrate 402 to be applied temporarily, i.e. during the manufacturing process of the grating device and more particularly during the lithographic process, use can be made of a grating support to which the substrate can be fixed during the particular processing steps. By removing the substrate from the grating support, the bending of the substrate can be undone. In exemplary embodiments, the grating support may be as shown in FIG. 4 illustrating a grating support 200 comprising at least two supports 202, 204 to which the focusing grating device 100 can be mounted. Coupling the focusing grating device 100 to the grating support 200 can be done in any suitable way, such as for example via a fastener such as an adhesive (e.g. glue), a screw, a rivet, a clamp, and the like. The grating support 200, may, in various embodiments, comprise one or more of support surfaces, support members, support brackets and alike.

In embodiments according to the present invention, the substrate 402 can be made large during manufacturing so that clamping in the holder is easy. After manufacturing the substrate 402 can be cut to the appropriate size.

In order to induce the curvature of the substrate, and consequently to the grating device, that is applied after the lithographic process and that is maintained in the final product, use can be made of a grating support to which the grating device can be fixed. Such a grating support can be similar as the grating support described for inducing curvature during the manufacturing of the grating, i.e. during the lithographic process. It will be understood that the grating support may be selected such that appropriate degree of bending occurs. This additional bending of the substrate, and hence the grating device, typically is induced during installation on the grating support and is maintained also during use by keeping the grating device installed on the grating support, when used for imaging. The grating support therefore also may be considered as part of the grating device.

As will be understood by the person skilled in the art, the mounting of the substrate on the grating supports will be in a different orientation so as to induce focusing in two different directions.

The grating features 408 may be grating lamellae, although other shaped features also may be used, depending on the type of grating that is envisaged. The grating features 408 typically are made of X-ray absorbing material, such as for example gold, lead, tungsten, or bismuth. In particular embodiments, alloys containing heavy metals may be used. Advantageously, high Z materials can be used that can be electroplated. The characteristics of the grating features 408, such as the pitch and the height, may be selected as function of the optical characteristics required for the system.

In a second aspect, the present invention relates to an X-ray system comprising at least a focusing grating device 100 as described in the first aspect. The X-ray system may for example be a dark field imaging system or may be a differential phase contrast imaging system, although embodiments are not limited thereto. The X-ray system may be any system which benefits from using a focusing grating device 100 having a large aspect ratio.

Figure 5:
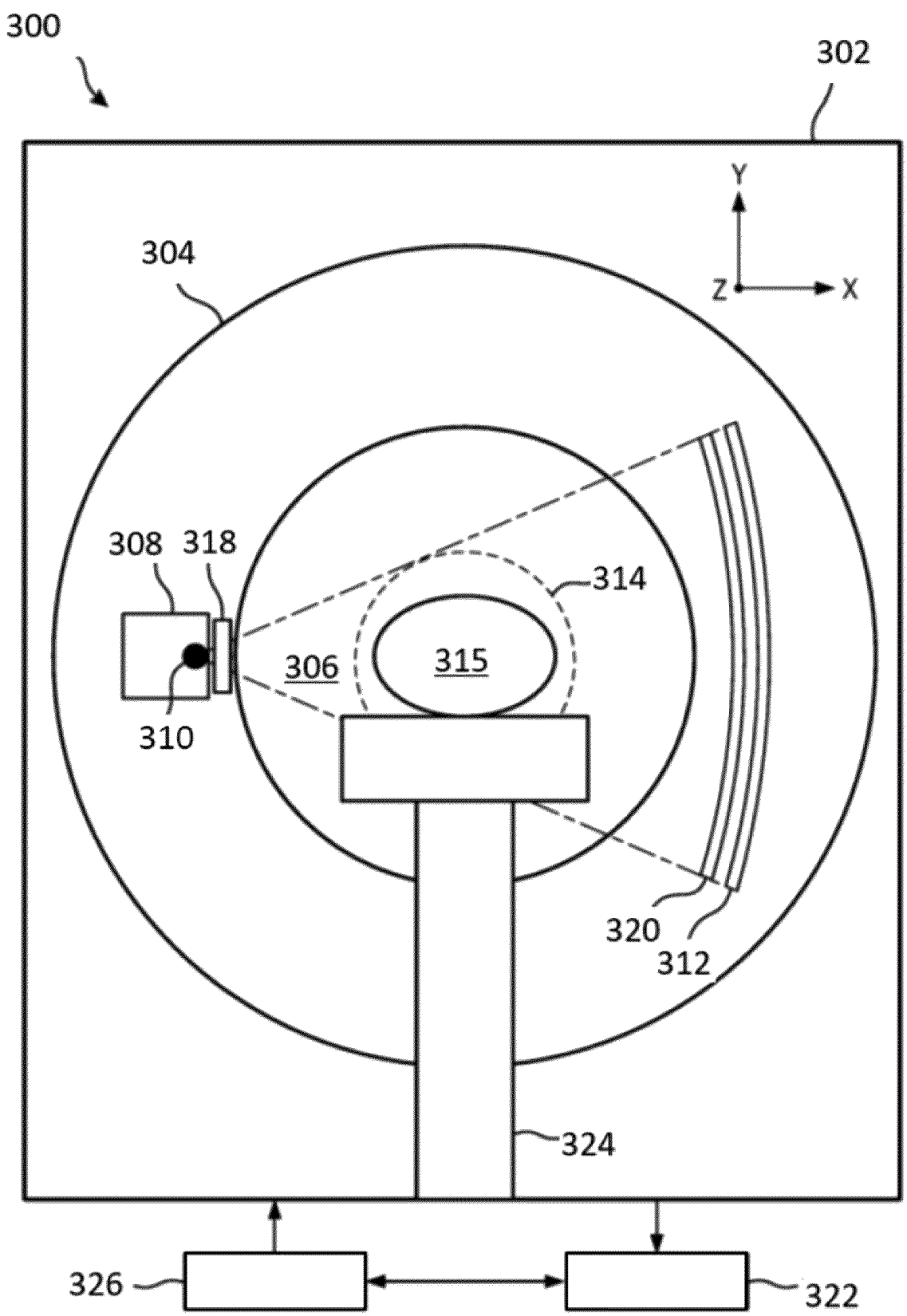
FIG. 5 illustrates an X-ray system comprising a focusing grating device according to an embodiment of the present invention.

An exemplary X-ray system which may benefit from the present invention is shown in FIG. 5. Such an X-ray system 300 may comprise a generally stationary gantry 302 housing a rotating gantry 304 that is rotatably supported by the stationary gantry and that rotates around an examination region 306 about a z-axis. It further comprises an X-ray radiation source 308 which produces a focal spot 310 thus emitting radiation that traverses the examination region 306. A radiation sensitive detector array 312 may be located opposite the radiation source 308 across the examination region 306. The radiation detector array 312 detects radiation traversing a field of view 314 and an object 315 therein and generates a signal indicative thereof. The system also typically comprises an X-ray imaging interferometer including one or more X-ray gratings, such as for example three gratings, one being a source grating G0 close to the X-ray source which typically may be a focusing grating device 100 as described in the first aspect of the present invention, an absorber grating close G2, 320 to the detector and a phase or absorber grating disposed depending on whether configured with conventional, inverse or symmetric geometry. The X-ray system 300 furthermore may comprise a grating support 318 for inducing certain distances between some of the gratings (G0, G1), maintaining the grating shapes— confer the grating support as described previously in the first aspect—and for maintaining grating locations. Further features and advantage of the source grating and optionally also of the other gratings may be as described for embodiments of the first aspect. The X-ray system 300 also may comprise for example a low energy filter, a bow-tie shaped attenuator and a beam collimator (not shown in FIG. 5). The X-ray system 300 also typically comprises a subject support 324, such as a couch, for supporting the object 315 in the field of view 314. Furthermore a general-purpose computing system or computer may serve as an operator console 326 and may comprise a reconstruction processor 322. Further features may be as known by the person skilled in the art.

In a third aspect, the present invention relates to a method of manufacturing a focusing grating device 100. The method may be especially suitable for manufacturing a focusing grating device 100 as described in the first aspect. According to the present invention, the method relates to manufacturing a focusing grating device 100 for focusing in a first focusing direction and a second focusing direction, whereby the first focusing direction is different from the second focusing direction. According to embodiments, the method comprises obtaining a stack of at least a substrate 402 and a resist layer 404. The method also comprises applying a bending of the stack in a first direction, performing a lithographic process on the stack while the substrate 402 is bent, electroplating the grating material so as to form the grating features 408 and substantially reversing the bending in the first direction of the stack. The latter results in a focusing grating device that provides a focusing in one direction, caused by the grating features that are created. The manufacturing method furthermore comprises, after said reversing the bending, applying a further bending of the stack in a further bending direction (the second direction), so as to induce a second focusing direction in the focusing grating device. This further focusing direction is caused by the further bending of the stack, which is maintained in the final focusing grating device.

Figure 6:
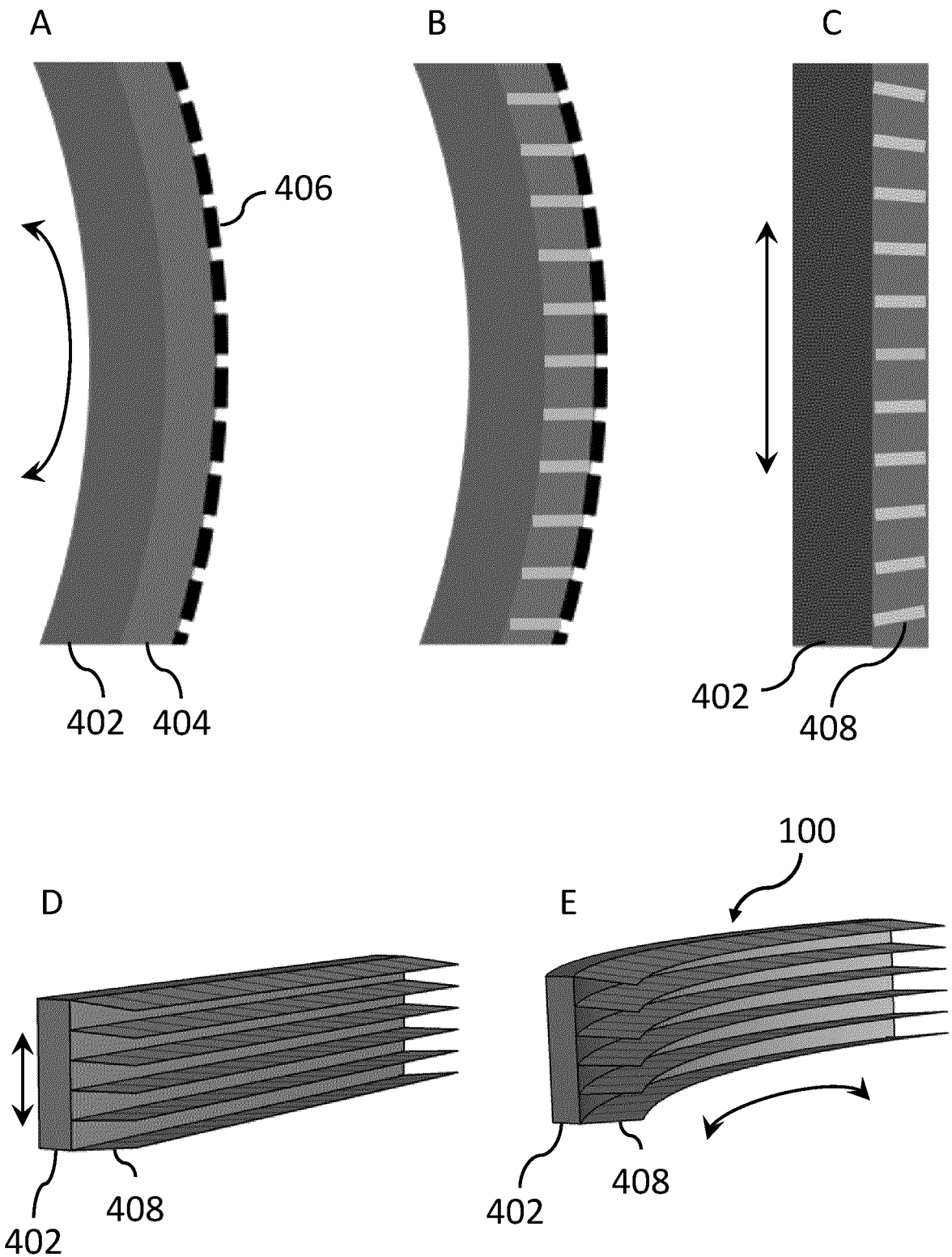
FIG. 6 illustrates different steps in the manufacturing process of a focusing grating device according to embodiments of the present invention.

By way of illustration, embodiments of the present invention not being limited thereto, standard and optional features of embodiments of the present invention are shown with reference to FIG. 6, the method for manufacturing a focusing grating device 100.

According the exemplary embodiment, the method comprises obtaining a stack of at least a substrate 402 and a resist layer 404. The substrate 402 thereby typically is a substrate that is substantially transparent for X-rays or has a low X-ray absorption coefficient. The resist layer 404 may be any suitable resist allowing performing lithographic process.

In a following step the method comprises applying a mask 406. The mask may be any mask suitable for performing the lithographic process known to be applied in the manufacturing of grating devices for X-rays.

According to embodiments of the present invention, the present invention then may comprise applying a bending of the stack in a first direction. The latter will allow to induce focusing by the grating features in one direction. FIG. 6 part A shows the partially manufactured mask 406 obtained in this step, illustrating the curved substrate 402 (curvature schematically indicated by the double arrow), the curved resist layer 404 and the curved mask 406.

The method further comprises, while the substrate 402 is bent, developing the resist layer 404 and performing an etching step for generating a negative pattern in the resist layer 404, for thereafter creating grating features 408. The latter is shown in FIG. 6 part B. Removal of the mask features also is applied.

After the negative pattern of resist features is formed, the method also comprises, optionally while the bending is still applied, electroplating the grating material so as to form the grating features 408.

The method thereafter comprises, as shown in FIG. 6 part C, substantially reversing the bending of the stack (schematically indicated by the double arrow). As a result and is it can be seen in the figure, the grating features 408 are positioned non-perpendicular to the substrate 402 surface, and thereby induce a first focusing direction for a radiation beam. FIG. 6 part D shows a different view of the step illustrated in FIG. 6 part C.

The method furthermore may comprise removing the remaining features from the resist layer to thus maintain the focusing grating.

In a further method step, the grating may be pre-formed or mounted on a grating support for inducing a second focusing direction, which is typically different from the focusing direction induced by the bended grating features. FIG. 6 part E illustrates a further bending of the stack (bending direction schematically indicated by the double arrow in FIG. 6, part E) that induces the second focusing direction, resulting in the focusing grating device 100.

In some embodiments, providing a stack may comprise provide a stack with a resist layer having a varying thickness along the first bending direction to take into account that by bending the resist layer the thickness may vary across the substrate.

The previously described method may comprise the different steps of the LIGA process, which is a lithographic fabrication technology including lithography, electroplating, and molding, that is currently often used as the manufacturing technique for the production of such gratings with large aspect ratio.

In embodiments according to the present invention, the substrate can be made large during manufacturing so that clamping in the holder is easier. After manufacturing the substrate can be cut to the appropriate size.

The invention claimed is:

1. A focusing grating device for focusing in a first focusing direction and a second focusing direction for an X-ray radiation beam, the first focusing direction being different from the second focusing direction, the focusing grating device comprising:
   a stack comprising a substrate and a resist layer;
   wherein the stack is bent in the first focusing direction;
   wherein a lithographic process on the stack is performed while the substrate is bent in the first focusing direction;
   wherein a grating material is electroplated to form grating features;
   wherein the bending of the stack is substantially reversed, and
   wherein after said reversing the bending, a further bending of the stack is applied to induce the second focusing direction.

2. The focusing grating device according to claim 1, wherein the substrate has a bending in a single direction only.

3. The focusing grating device according to claim 1, wherein a side edge of at least one of the grating features makes for at least one position an angle of at least 1 degree with respect to a perpendicular direction on the substrate.

4. The focusing grating device according to claim 1, wherein the focusing grating device has an aspect ratio of at least 30.

5. The focusing grating device according to claim 1, wherein a bending stress in at least part of the grating features in the second focusing direction is substantially higher than a bending stress in said at least part of the grating features in the first focusing direction.

6. The focusing grating device according to claim 1, wherein the grating features are grating lamellae.

7. The focusing grating device according to claim 1, wherein the grating features are made of X-ray absorbing material.

8. The focusing grating device according to claim 1, wherein the substrate comprises at least one of a graphite, a glass, and a Capton®.

9. A method for producing a focusing grating device for focusing in a first focusing direction and a second focusing direction for an X-ray radiation beam, the first focusing direction being different from the second focusing direction, the method comprising:
   providing a stack of at least a substrate and a resist layer;
   applying a bending of the stack in the first focusing direction;
   performing a lithographic process on the stack while the substrate is bent in the first focusing direction;
   electroplating a grating material so as to form grating features;
   substantially reversing the bending of the stack, and
   after said reversing the bending, applying a further bending of the stack to induce the second focusing direction in the focusing grating device.

10. The method for producing a focusing grating device according to claim 9, wherein said performing a lithographic process comprises applying a mask.

11. The method for producing a focusing grating device according to claim 9, further comprising developing the resist layer in the lithographic process, and wherein the electroplating is performed prior to said substantially reversing the bending of the stack.

12. The method for producing a focusing grating device according to claim 9, wherein the resist layer has a varying thickness along the first focusing direction.

* * * * *